March 9, 1948.  A. J. HORNFECK  2,437,603
MACHINE TOOL CONTROL
Filed Dec. 18, 1943  5 Sheets-Sheet 1

Inventor
ANTHONY J. HORNFECK
By Raymond D. Junkins
Attorney

March 9, 1948.　　　A. J. HORNFECK　　　2,437,603
MACHINE TOOL CONTROL
Filed Dec. 18, 1943　　　5 Sheets-Sheet 2

Inventor
ANTHONY J. HORNFECK
By Raymond W. Jenkins
Attorney

March 9, 1948.　　　A. J. HORNFECK　　　2,437,603
MACHINE TOOL CONTROL
Filed Dec. 18, 1943　　　5 Sheets-Sheet 3

Inventor
ANTHONY J. HORNFECK
By Raymond D. Jenkins
Attorney

Inventor
ANTHONY J. HORNFECK

March 9, 1948.   A. J. HORNFECK   2,437,603
MACHINE TOOL CONTROL
Filed Dec. 18, 1943   5 Sheets-Sheet 5

Inventor
ANTHONY J. HORNFECK
By Raymond D. Junkins
Attorney

Patented Mar. 9, 1948

2,437,603

UNITED STATES PATENT OFFICE 2,437,603

MACHINE TOOL CONTROL

Anthony J. Hornfeck, Cleveland Heights, Ohio, assignor to Bailey Meter Company, a corporation of Delaware Application December 18, 1943, Serial No. 514,786

2 Claims. (Cl. 318—34)

1

This invention relates to contour control, or duplicators as they are sometimes called, for machine tools such as lathes, shapers, planers, milling machines, die sinking machines, and the like.

An object of my invention is to provide a contour control wherein the desired contour or shape is accurately produced on a work piece, thereafter requiring a minimum of hand finishing.

Still another object of my invention is to provide a contour control or duplicator which may be readily applied to a wide variety of machine tools.

Another object of my invention is to provide a duplicator wherein the linear cutting speed of the tool relative to the work is maintained constant, or is varied in predetermined manner.

Further objects will be apparent from the description and drawings, in which.

As is well understood by those familiar with the art, in some machine tools, such as lathes, the tool is moved longitudinally and transversely of the work piece which, except for rotation about its center, remains stationary. In other machine tools, such as some types of milling machines, the work piece may be moved in two directions while the tool, except for rotation about its axis, remains stationary. In some other types of milling machines and in some die sinking machines the tool may be moved in one, two or three directions and the work piece also may be moved in one or more directions. In all instances it will be observed, however, that it is the relative movement between the tool and work piece that

2 causes the work piece to be formed to a desired shape.

As one specific embodiment I have chosen to illustrate and describe my invention as incorporated in a lathe wherein the work piece, except for rotation about its center, remains stationary and the tool is moved transversely and longitudinally thereof. As another specific embodiment I have illustrated my invention as applied to a milling machine wherein the tool, except for rotation about its center, remains stationary and the work piece is moved in two directions in order that the tool may cut the work piece to a desired shape. It will thus be evident that my invention is applicable to a wide variety of machine tools or metal forming machines and that when I speak of relative movement between the tool and work piece I include either an arrangement where the tool is stationary and the work piece moves, or where the work piece is stationary and the tool is moved, or a combination of the two.

Figure 1:
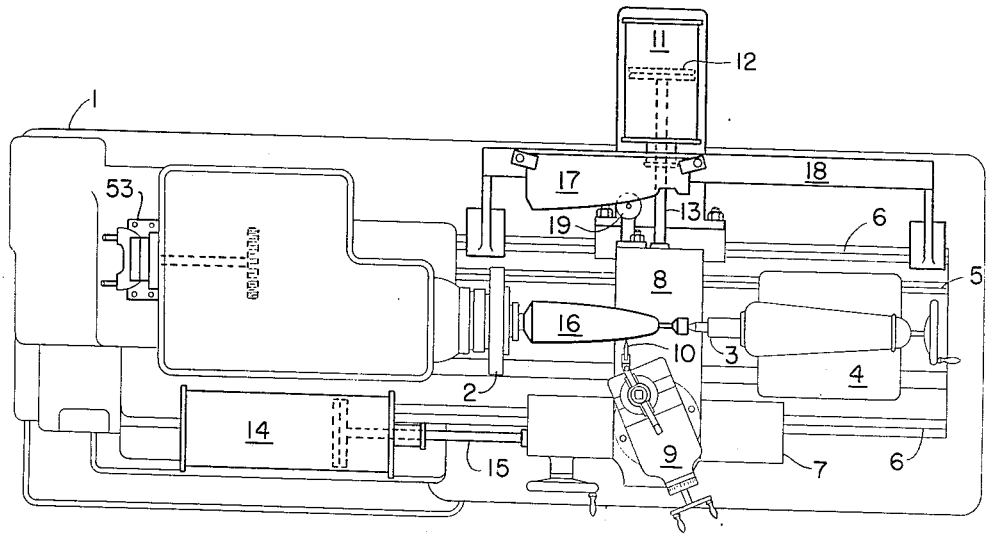
Fig. 1 is a plan view of an engine lathe illustrating one application of my invention thereto.

Referring to Fig. 1, I show my invention applied to an engine lathe 1, having a head stock 2 adapted to be rotated by any suitable means (not shown) and a tail stock 3. A carriage 4 is movable longitudinally along the bed of the lathe in suitable ways 5 and supports the tail stock 3. Also movable longitudinally along the bed of the lathe, in suitable ways 6, is a carriage 7 upon which is mounted a cross-slide 8 movable on ways transversely of the bed of the lathe.

The cross-slide 8 is provided with an adjustable tool support 9 in which is secured a tool 10. Transverse movements of the tool 10 are produced through the agency of a hydraulic cylinder 11 having a piston 12 adapted to position the cross-slide 8 through the agency of a piston rod 13. Longitudinal movements of the tool 10, that is movements of the tool parallel to the bed of the lathe in a longitudinal direction, are produced by means of a hydraulic cylinder 14 having an operating piston rod 15.

Supported by the head stock 2 and the tail stock 3 is a work piece 16 which, for illustrative purposes, is shown as being formed to a parabolic shape by the tool 10. The particular shape has no significance, it being apparent as the description proceeds that by my invention a work piece may be formed automatically to any desired contour. A master template or cam 17 is rigidly held in parallelism to the work piece 16 upon any convenient extension 18 of the lathe bed. The profile of the master 17 is the contour which I desire to reproduce upon the work piece 16. In Fig. 1 the taper of the work piece 16 follows in general a parabolic function merely as an example.

For contacting and following the profile of the master 17 I provide a tracer assembly 19 rigidly mounted on and movable with the cross-slide 8. The tracer assembly 19 is shown in larger, more diagrammatic fashion in Fig. 2 as having a pivoted bell crank 20, the end of the vertical arm continually contacting the front edge or profile of the master template 17. From the horizontally extending arm is freely suspended a metallic core piece 21 positioned relative three windings 22, 23 and 24. It will be apparent that the magnetic coupling between the primary coil 22 and the secondary coils 23, 24 depends upon the relative position of the magnetic core piece 21, and consequently upon the position of the tracer arm 20. The electric circuit including the windings 23, 24 is energized inductively from the primary circuit and in amount depending upon the magnetic coupling between the circuits. The assembly comprising the windings 22, 23 and 24 along with the magnetic core piece 21 may be constructed as described and claimed in my copending application Serial No. 453,489, and now abandoned.

Energization of the primary winding 22, from an alternating current source, induces a voltage in the windings 23, 24 (which are oppositely wound in bucking relation) to give the core 21 a position corresponding to zero potential through the output circuit including the windings 23, 24, and thus providing an electrical neutral corresponding to a mechanical neutral position of the tracer assembly 19.

The windings 23, 24 are connected through an amplifier 25 to a power tube 26 whose output circuit includes solenoid windings 27 and 28 connected in series across a source of alternating current potential. The arrangement is such that the power tube 26 is sensitive to the phase output of the windings 23, 24; with the system so biased that normally a flow of current through the power tube 26 is opposed by the biasing effect of the springs 29 and 30.

Figure 5:
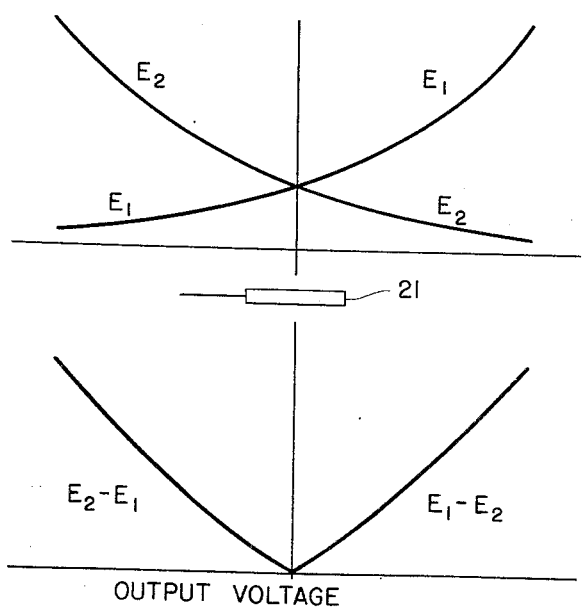
Fig. 5 is a graph of voltages in connection with Fig. 2.

Referring to the graph of Fig. 5 it will be observed that if $E_1$ and $E_2$ are the voltage curves of the windings 23, 24, then when the plunger 21 is at its mechanical neutral the value of $E_1-E_2=0$ output voltage and $E_2-E_1=0$ output voltage. As the plunger 21 moves to the right (Fig. 5) the value of $E_1$ increases while the value of $E_2$ decreases and the value of $E_1-E_2$ increases along a substantially straight line as indicated in the lower graph. If the plunger 21 is moved to the left the reverse is true and $E_2-E_1$ gradually increases along a substantially straight line.

As the plunger 21 moves through its mechanical and electrical neutral position it will be observed that the output voltage of the circuit including windings 23 and 24 reverses in phase. The system is phase sensitive and current flow through the power tube 26 is increased above or decreased below a normal flow, which is so chosen as to offset the biasing action of the springs 29, 30 for desired neutral or normal position. When the plunger 21 is at the mechanical and electrical neutral position, the current flow through the power tube is at some normal value, overcoming, through the agency of the solenoid windings 27, 28, the biasing action of the springs 29, 30. If the plunger 21 moves increasingly into the field of the winding 23 and decreasingly relative to 24, then an output voltage of one phase is increasingly effective upon the control of the tube 26, whereas if the plunger 21 moves in the opposite direction an increasing voltage of opposite phase is increasingly effective upon the tube 26. This results in either an increase in current flow through the tube 26, or a decrease in current flow, relative to the neutral or normal current flow therethrough.

Figure 4:
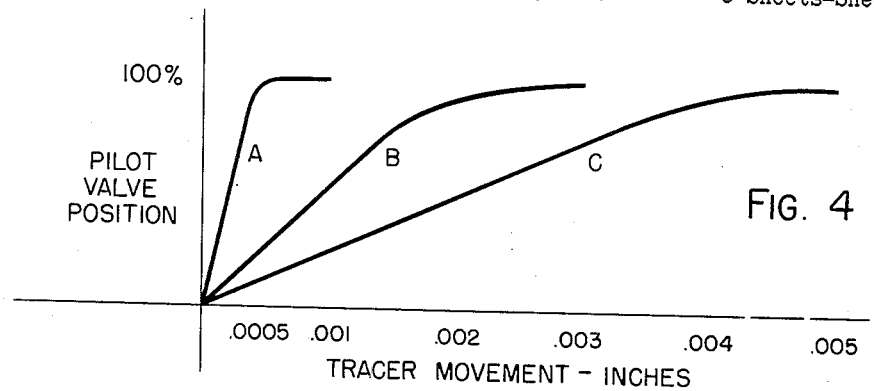
Fig. 4 is a graph of operation of Figs. 1 and 2.

The arm 31, movable relative to the resistance 32, provides a sensitivity control varying the slope of the curves of Fig. 4, which are graphs of position of the solenoid cores 33, 34 relative to movement of the tracer arm 20 and of the core 21. Thus, for example, curve A shows a total travel of the cores 33, 34 for a total movement of the tracer arm 20 of .0005 inch for example. Curve C, for example, is representative of a different relative position of the elements 31, 32 wherein total travel of the solenoid cores 33, 34 is accomplished through a travel of the tracer arm 20 of approximately .005 inch. Thus the relative position of the elements 31, 32 provides a sensitivity adjustment between travel of the tracer arm 20 and travel of the solenoid cores 33, 34.

The adjustable arm 35 and resistance 36 provide an adjustable bias to control the neutral position of the solenoid cores 33, 34, i. e. the value of current flow through the output circuit at zero phase across 23, 24. In other words, to determine the current flow through the output circuit of the power tube 26 including the solenoid coils 27, 28 at time of balanced phase relation across the windings 23, 24 resulting in neutral control of the power tube 26. This is not to be confused with the voltage values of Fig. 5, which are of the control or input circuit of the power tube 26.

The electrical control of the output circuit of the tube 26, namely, control by the elements 35, 36, could be duplicated by adjustment of the spring tension of the springs 29, 30, or by a combination of the two. It is in effect a control of the biasing of the elements 33, 34 at what may be termed the neutral or normal position of the tracer 19.

For control of the hydraulic motor 11 I provide an oil pilot valve 37, whose movable element is positioned by and with the solenoid core 33 against the bias of the spring 29 and under the influence of the solenoid winding 27. For positioning of the hydraulic motor 14, I provide a variable fluid resistance 38 whose movable element is positioned by and with the solenoid core 34 against the bias of the spring 30 and under the influence of the solenoid winding 28. The pilot valve 37 and the adjustable fluid resistance 38 may be of the type disclosed and claimed in the copending application of Clarence Johnson, Serial No. 384,375, now Patent No. 2,372,426, granted March 27, 1945.

I show an oil pump 39 driven by a motor 40 and drawing its supply of oil from a sump 41. Oil under pressure is supplied the pilot valve 37 by the pump 39 through a pipe 42. From the pilot 37 oil is supplied to one end or the other of the hydraulic motor 11 through the pipes 43 or 44. Drainage from the pilot 37 is returned to the sump 41 through a pipe 45.

Figures 2, 3:
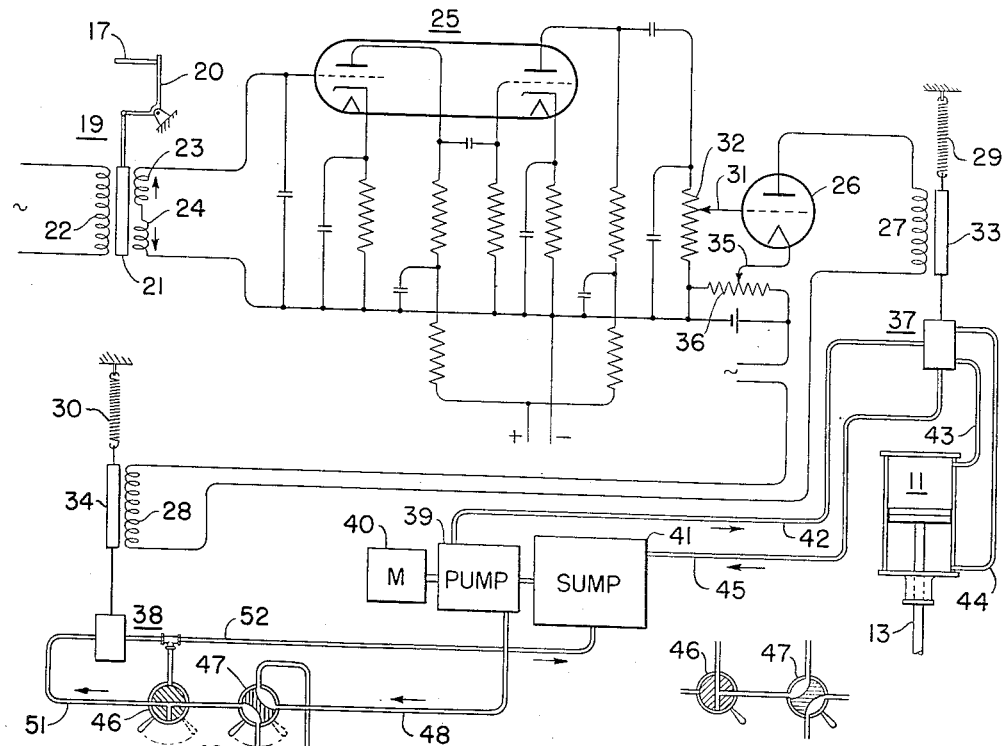
Fig. 2 is an electric and hydraulic circuit diagram of my contour control embodied in the lathe of Fig. 1.
Fig. 3 shows a modification of a portion of Fig. 2.

In connection with the hydraulic motor 14 and adjustable resistance 38 I provide switching valves 46, 47 arranged to be moved together to either a "normal" or a "rapid traverse" position of operation of the motor 14. The valves 46, 47 are shown in Fig. 2 in the "normal" operating position. Oil under pressure from the pump 39 is forced through the pipe 48, the valve 47, and the pipe 50, to one end of the hydraulic motor 14. Oil from the other end of the motor passes through a pipe 49, the valve 47, the valve 46, the pipe 51, the adjustable resistance 38 and the pipe 52 to the sump. The regulation of the variable resistance 38, for any displacement of the core 34 from neutral, determines the rate of flow of oil through the pipe 49, and consequently the rate of travel of the piston rod 15 toward the left in the drawing of Fig. 2. Thus the rate of longitudinal travel of the tool 10 along the work piece 16 is controlled by the variable resistance of 38 to passage of oil therethrough from the left-hand end of the hydraulic motor 14.

In Fig. 3 I show the passage relation of the switching valves 46, 47 for a "rapid return" of the piston rod 15 from left to right in Fig. 2. That is, for a rapid return of the tool 10 to the beginning of its working travel. In such position of the valves 46, 47 oil from the pump 39 passes directly through the pipe 48, the valve 47, and the pipe 49; while oil from the right-hand end of the motor 14 passes directly through the pipe 50, the valve 47, the valve 46 to the pipe 52 and sump 41. Thus on the rapid return of the piston rod 15 there is no throttling of its speed of travel by the variable resistance 38, and thus the tool is traversed to the right at maximum speed.

In general the operation of the system illustrated in Figs. 1, 2 and 3 is as follows. If the contacted edge of the master template 17 is parallel to the axis of the work piece 16, then the tracer core 21 is in a normal or neutral position corresponding to that illustrated in Fig. 5, and resulting in zero output voltage through the intermediate circuit including the windings 23, 24. Under this condition a selected normal current flow exists through the output circuit including the power tube 26 and the solenoid windings 27, 28 exerting such counter-pull against the biasing springs 29, 30 as to position the core pieces 33, 34 and the movable elements of the assemblies 37, 38 to a normal or neutral position. Under this condition the pilot valve 37 locks oil from the pipes 43, 44 so that the piston rod 13 is not moving and the tool 10 travels a cutting path parallel to the axis of the work piece 16. At the same time the variable restriction 38 is in position to provide a normal speed of travel of the piston rod 15 from right to left on the drawing, thus moving the tool 10 along the work at a uniform normal speed.

If the profile of the cam 17 recedes from the axis of the work piece, or advances toward the axis of the work piece, the core 21 is correspondingly positioned relative to the windings 23, 24 in proper direction to either increase or decrease the current flow through the windings 27, 28, and cause the core pieces 33, 34 to move upwardly or downwardly as illustrated on the drawing. Such movement causes the hydraulic motor 11 to position the tool 10 toward or away from the axis of the work piece 16, and thus reproduce upon the work piece 16 the contour of the master template 17. At the same time any departure of the movable element of the variable resistance 38 in either direction from normal position will increase the resistance to oil flow therethrough and tend to slow up travel of the piston rod 15. Under this condition longitudinal travel of the tool 10 from right to left on the drawing will be at a speed slower than the normal speed, depending upon the rate of travel of the tool 10 toward or away from the axis of the work piece 16. If, for example, the profile of the cam 17 includes a shoulder at right angles to parallelism with the axis of the work piece 16, then there will be a complete stoppage of longitudinal travel of the tool 10 while the tool is advancing directly toward the axis of the work piece or receding directly therefrom. In this manner a right angle shoulder may be cut on the work piece 16 without the tool 10 traveling longitudinally relative to the axis of the work piece. It will be observed that movement of the core piece 21, either upwardly or downwardly on the drawing relative to the windings 23, 24, from a neutral or normal position, results in a decrease of speed of travel of the tool 10 in a longitudinal direction from its normal speed of longitudinal travel.

After complete travel of the tool has been accomplished from right to left, then a rapid return of the tool 10 to the right may be accomplished by moving the switching valves 46, 47 to the position shown in Fig. 3 wherein the variable restriction 38 is made non-effective upon the hydraulic motor 14.

Figure 10:
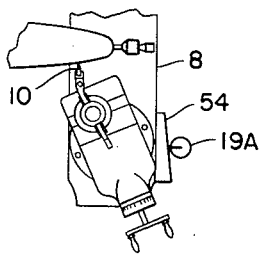
Fig. 10 is a modification of a part of the lathe of Fig. 1.

The system which I have just described in connection with Figs. 1-5 inclusive, is in general a two-element control wherein the lathe tool is positioned both transversely and longitudinally of the work piece. It will, of course, be seen that either element may be employed without necessarily employing the second element. For example, a lathe or similar material forming machine may have the tracer assembly control only the cross feed of the tool or only the longitudinal feed of the tool, or the two combined as previously described. Furthermore, it may in certain instances be desirable to include a third element, namely, a control of speed of rotation of the work piece 16 so that the linear cutting speed of the tool will remain constant regardless of the diameter of the work piece at which it is cutting. In other words, so that the speed of rotation of the work piece 16 will be different when the tool 10 is cutting on a large diameter than it is when the tool is cutting on a smaller diameter. To illustrate such a possibility I have indicated on Fig. 1 an oil motor 53 for rotating the work 16 and under the control of a tracer assembly 19A (Fig. 10) which may be mounted on and longitudinally carried by the carriage 7 with the tool and cross-slide 8.

On the cross-slide 8 I locate a cam surface 54 movable with the tool 10 and relative to the tracer arm 19A so that the tracer arm 19A is deflected by the cam 54 an amount indicative of the transverse position of the tool 10 relative to the axis of the work piece 16. As explained in connection with Fig. 2, the tracer assembly 19A may control a variable oil restriction such as shown at 38 in an oil supply line leading from the pump 39 to the motor 53, or in the discharge between the motor 53 and the sump 41, so that the speed of the motor 53 will depend entirely upon the position of the core 21 relative to the windings 22, 23, 24, and consequently will depend upon the deflection of the tracer arm 19A with reference to the cam surface 54. In other words, as the diameter at which the tool 10 is cutting increases or decreases the speed of rotation of the work piece 16 will correspondingly decrease or increase respectively. It will be apparent that this third element of control may be incorporated on the lathe of Fig. 1 and Fig. 2 either alone or in combination with either or both of the two elements of transverse and longitudinal tool travel.

Figure 6:
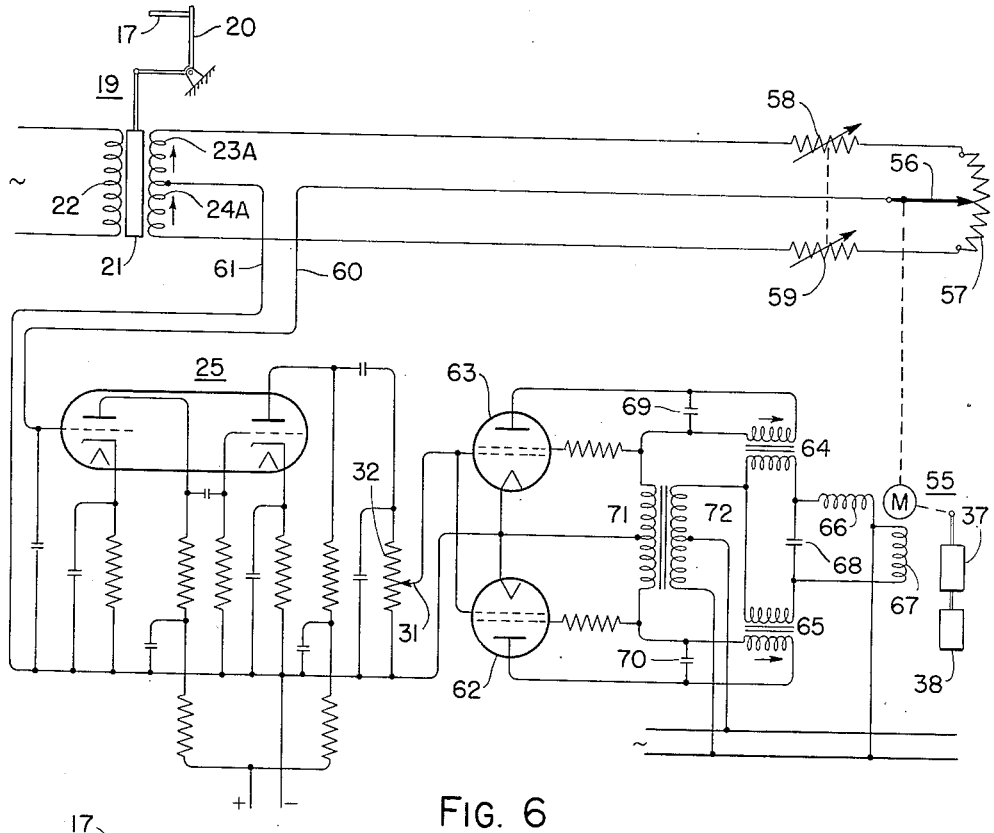
Fig. 6 is another embodiment of my invention as depicted in an improved electric circuit.

In Fig. 6 I illustrate an embodiment of my invention wherein the oil pilot valve 37 and the variable restriction 38 are jointly and simultaneously positioned by a capacitor-run type of alternating current motor 55. The motor 55 is also adapted to position a contact arm 56 relative to a potentiometer 57 for a partial balancing of the electrical circuit following an unbalance thereof.

The electrical arrangement comprises a mutual inductor potentiometer bridge circuit wherein the tracer assembly 19 includes a 3-coil mutual inductor 22, 23A, 24A. The bridge circuit includes a potentiometer or resistance winding 57 divided into two portions by the movable contact arm 56 and hand adjustable resistances 58, 59. It will be observed that the bridge including the windings 23A, 24A and resistances 57, 58 and 59 is not a conventional bridge to which a source of power is directly applied. The power supply is obtained through the magnetic coupling of core piece 21 between the primary energized winding 22 and the secondary windings 23A, 24A. In a steady state of bridge balance the core piece 21 is in the neutral or normal position. Displacement of the core piece 21 in one direction or the other unbalances the bridge and results in a potential being established in the conjugate conductors 60, 61 whose magnitude is representative of the magnitude of the change in position of the core 21, while its phase is representative of the sense of change in the position of the core piece 21. In other words, if the core 21 were moved upwardly, then the potential in the conductors 60, 61 would be of one phase while if the core 21 were moved downwardly the potential in the conductors 60, 61 would be of opposite phase.

The amplifier 25 is sensitive and responsive to the phase of the potential in the conductors 60, 61 for control of the motor control tubes 62, 63. Any movement of the core 21 causes an unbalance of the bridge circuit and the direction and extent of unbalance is felt in the conjugate conductor 60, 61 and applied to the amplifier 25, which in turn controls the tubes 62, 63. The output circuits of the tubes 62, 63 are individually included in the circuits of saturating windings of saturable core reactors 64, 65 having alternating current output windings in a loop circuit including motor windings 66, 67 and a capacitor 68.

The capacitor-run motor 55 is of a type wherein rotation is obtained in one direction when current flow is directly through the winding 66 and simultaneously through the winding 67 in series with the capacitor 68. Rotation in the opposite direction is obtained when current flow is directly through the winding 67 and is simultaneously through the winding 66 in series with the capacitor 68. Desired directional rotation of the motor 55 is accomplished by preponderance of saturation in the saturating windings of the reactors 64, 65. Whichever reactor predominates determines the direction of rotation of the motor, while the amount of predominance determines the speed of rotation.

Across the saturating winding of the reactor 64 I have shown a condenser 69. A similar condenser 70 is connected across the saturating winding of the reactor 65. These condensers smooth out the pulsating direct current from the motor control tubes 62, 63 so that the saturating windings of the reactors receive essentially a smooth direct current. Pulsating direct current from the tubes 62, 63 is half wave rectification and the respective condenser discharges in the time interval between the successive pulsations, thus tending to build up those valleys and tending toward a smooth direct current flow to the saturating windings rather than a definite pulsation or intermittent flow.

In order to obtain maximum sensitivity I have found that it is imperative that the saturating windings of the reactors 64, 65 have a high impedance and that necessarily limits the current flow, for normally the current would be half wave direct current with a large A.-C. component. Thus I have found that the use of the condensers 69, 70 is very important from a practical standpoint, particularly in obtaining high sensitivity.

The transformer 71 is an auto transformer having a winding 72 in series with the A.-C. output winding of the reactors 64, 65 so that full voltage will be obtained to operate the motor 55, which is preferably a standard or commercial type of motor.

Whenever the profile of the master template 17 is parallel with the axis of the work piece the core 21 will be in its neutral or normal position, and the motor 55 not rotating. The movable elements of the pilot 37 and variable restriction 38 will be in their normal position. Upon a change in the profile of the cam 17, resulting in a movement of the tracer arm 20 and consequent raising or lowering of the core 21 relative to the windings 23A, 24A, there will be an unbalancing of the bridge circuit, resulting in a potential in the conjugate conductor 60, 61 of a phase depending upon the direction of movement of the element 21 relative to the windings 23A, 24A. Such unbalance of the bridge circuit results in a rotation of motor 55 in direction and at a speed dependent upon the direction of movement of the core 21 and the extent of such movement.

The motor 55, in addition to positioning the movable elements of 37, 38, is also adapted to move the contact arm 56 relative to the potentiometer or resistance 57 for at least a partial balancing of the bridge circuit following an unbalance thereof. In other words, if the tracer arm 20 moves in one direction or the other, resulting in an unbalance of the bridge circuit and a rotation of the motor 55 then such movement of the motor 55 positions the arm 56 relative to the potentiometer 57 in proper direction to tend to rebalance the bridge circuit and stop the motor. Under some conditions of operation a complete rebalancing may be desired. It is contemplated that the gearing between the motor 55 and the arm 56 may be so chosen that under certain conditions the motor would not be expected to completely rebalance the circuit, or in other words an insufficient movement (for rebalancing) of the contact arm 56 would be accomplished. The remaining balancing (simultaneously with the movement of the arm 56) would be accomplished by movement of the tracer assembly 19 relative to the template 17. Such movement of the assembly 19 is, of course, accomplished by movement of the tool 10 and cross-slide 8 on which the tracer assembly 19 is mounted. However, a partial rebalancing of the bridge circuit by the motor 55 would tend to prevent hunting or overtravel in case of sudden drastic changes in the profile of the template 17.

Figure 7:
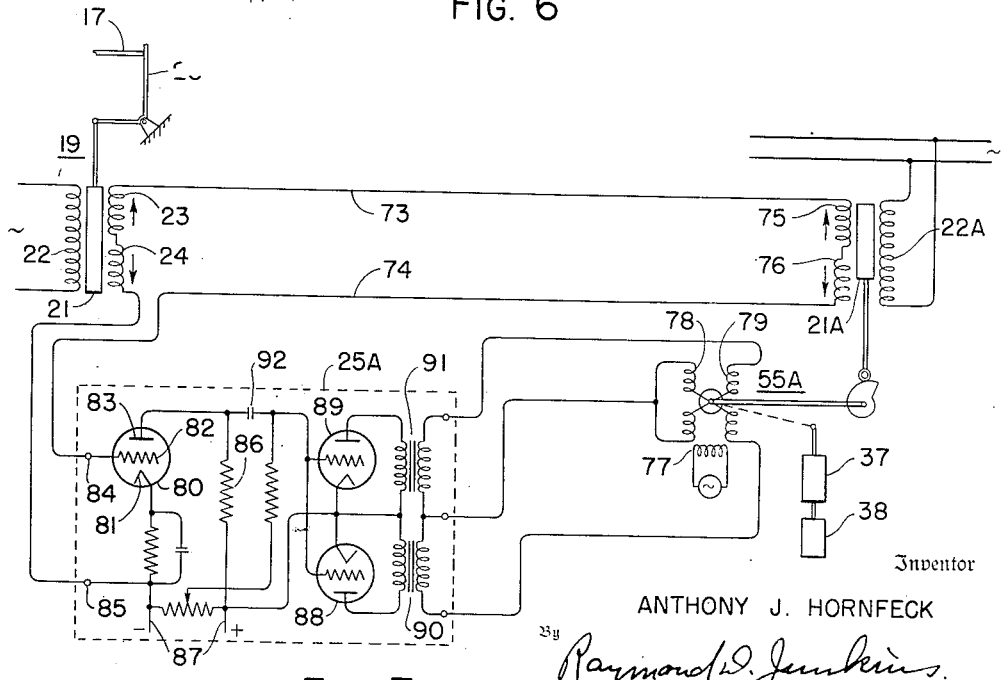
Fig. 7 is a further electric circuit diagrammatically illustrating an embodiment of my invention.

In Fig. 7, I show a further embodiment of my invention in a balanceable circuit energized inductively from a primary winding 22 and a similar primary winding 22A. The secondary circuit includes windings 23, 24 and 75, 76 in loop connected by conductors 73, 74. Conductor 74 includes an amplifier 25A for control of a motor 55A. The motor 55A is shown as being of the type having a field winding 77 energized from a suitable source of alternating current, and opposed shading pole windings 78, 79. When the windings 78 and 79 are open circuited or are both effectively short circuited the motor 55A remains stationary. When the pole winding 78 is effectively energized as by being short circuited, the motor 55A will rotate in one direction and when the winding 79 is effectively energized as by being short circuited the motor 55A will rotate in opposite direction.

In order that a voltage of one phase in the conductor 74 will cause, for example, effective short circuiting of the pole winding 78 and a voltage of reverse phase will cause effective short circuiting of the winding 79, I employ an amplifying and control circuit between the conductor 74 and the motor 55 forming the subject matter of Patent 2,275,317 to John D. Ryder.

The voltage existing across the conductor 74 is first amplified by means of an electron discharge device 80 having a cathode 81, a grid 82, and an anode 83. The voltage between the terminals 84, 85 controls the potential relationship between the cathode 81 and grid 82. The plate circuit of the electron discharge device 80 includes a resistance 86 and a source of direct current 87. When the potential difference between the terminals 84, 85 is zero a direct current may or may not pass through the plate circuit of the device 80 depending upon the electrical characteristics of the device and the bias of the grid 82.

An alternating current voltage between the terminals 84, 85 superimposes upon the normal grid bias of the device 80 a pulsating control potential which causes the current in the output circuit of the device 80 to become similarly pulsating in character. The amplitude of the pulsations in the output circuit will depend upon the difference in potential of the terminals 84 and 85 while the phase of the pulsations will depend upon whether the potential at the terminal 84 is greater or lesser than that at the terminal 85. The output is utilized to control the current transmission through a second pair of electron discharge devices 88 and 89, the output circuits of which are inductively coupled through transformers 90 and 91 to the circuits of the pole windings 78 and 79 respectively. Such direct current as may normally flow through the output circuit of the device 80 will have no effect upon the potential impressed upon the grids of the devices 88 and 89 by virtue of a condenser 92. Upon an alternating current voltage existing between the terminals 84 and 85 however the pulsating component of the current in the output circuit of the device 80 will pass through the condenser 92 and render either the device 88 or the device 89 conducting selectively in accordance with the phase of the voltage between the terminals 84 and 85.

Such selective control of the devices 88 and 89 is obtained by arranging them to have opposite polarity. That is, when the anode of the device 88 is positive, the anode of the device 89 is negative, and vice versa. As hereinbefore stated, the phase of the pulsating current in the output circuit of the device 80 will depend upon whether the potential of the terminal 84 is greater or lesser than at the terminal 85. Accordingly, upon the potential at the terminal 84 being greater than that at the terminal 85 pulsating current in the output circuit of the device 80 may render, for example, the grid of the device 88 more positive with respect to its cathode during the same half cycle that its anode is positive, and hence the device will be rendered conducting. Conversely, if the potential of the terminal 84 is less than that of the terminal 85, the pulsating current in the output circuit of the device 80 will be in phase with the plate potential of the device 89, and hence will render the grid thereof more positive with respect to its cathode during the same half cycle that its anode is positive, so that the device will be rendered conducting.

When either the device 88 or 89 is rendered conducting, thereby effectively short circuiting the secondary of the transformer 90 or 91 respectively, the impedance of the circuit of the pole windings 78 or 79 is sufficiently reduced to effect rotation of the motor 55A in one direction or the other. Such rotation positions the pilot 37 and the variable restriction 38 and simultaneously positions a core piece 21A relative to the windings 75, 76 to again make the potential induced in the windings 75, 76 equal to that induced by the winding 22 and the windings 23, 24. Thus movement of the motor 55A tends to rebalance the electrical network, following an unbalance thereof, simultaneously with movement of the tracer assembly 19 relative to the template 17 for repositioning the core 21 to its normal or neutral position.

Figure 8:
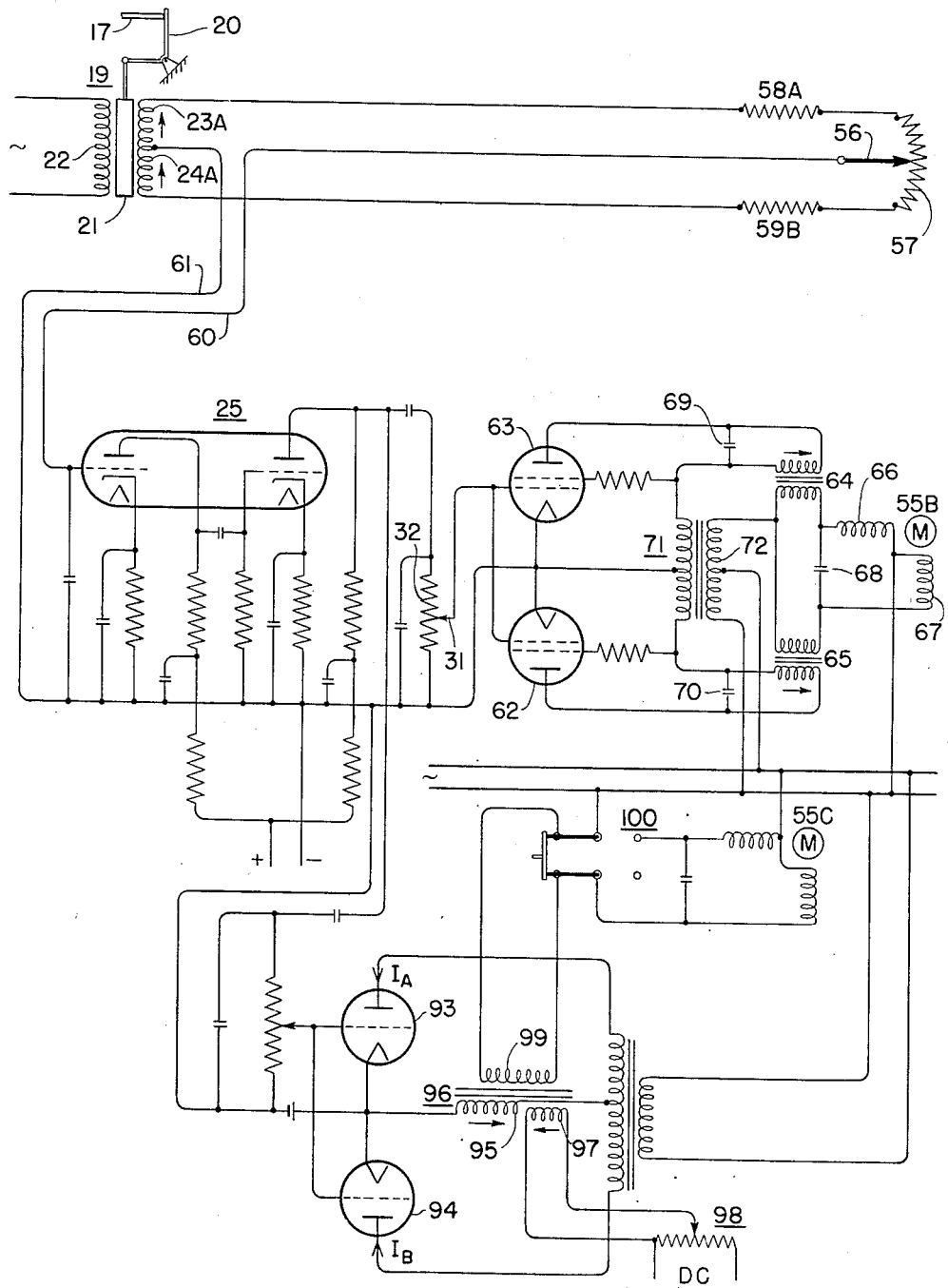
Fig. 8 is an electric circuit for a two-element contour control of a metal working machine.

In Fig. 8 I show an embodiment of my invention wherein the capacitor-run alternating current motor 55B is not used to position a pilot 37 or variable restriction 38, but may be connected directly through the necessary gear reduction and lead screw to position the cross-slide 8 and tool 10 toward or away from the work piece 16. Simultaneously a capacitor-run motor 55C is utilized for traveling the tool 10 longitudinally of the work piece 16 at a variable speed and with provision for rapid return of the tool to its starting point.

Figure 9:
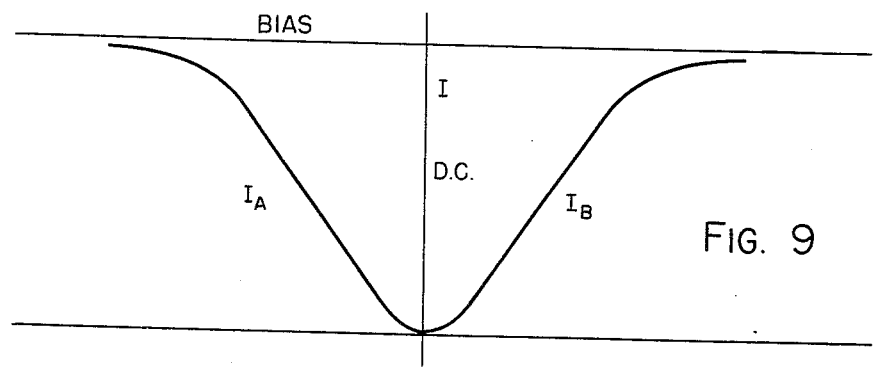
Fig. 9 is a graph of values in connection with Fig. 8.

The electric circuit control of the motor 55B is substantially as described in connection with the motor 55 of Fig. 6. At the outlet of the amplifier 25 I have taken a parallel connection off for control of motor tubes 93, 94 in circuit with the motor 55C. The tubes 93, 94 are phase sensitive and are so biased that if the core 21 moves out of its neutral position in one direction, then the tube 93 is turned on, and if it moves out of neutral in the other direction then the tube 94 is turned on. At neutral position of the tracer core 21 both tubes are turned off and $I_A$ and $I_B$ are zero (Fig. 9). As the core 21 departs from neutral in one direction the current $I_A$ increases to a maximum, and if the core 21 departs from neutral in the other direction the current $I_B$ increases to a maximum. This is clearly shown in Fig. 9.

In the output circuits of the tubes 93, 94 is the saturating winding 95 of a saturable core reactor 96 having a bias direct current saturating winding 97 provided with adjustable means 98. The reactor 96 has an alternating current output winding 99 connected through the double-pole double-throw switch 100 to energize the motor 55C.

The saturable core reactor 96 is continuously biased by the direct current saturating winding 97 to an extent of greater magnetism than the saturation effect ever reached by the winding 95 through the action of either the tube 93 or the tube 94. This is shown in Fig. 9. Thus at neutral position of the core 21 the current flow through the saturating winding 95 is zero and that through the bias winding 97 is maximum. Under these conditions of minimum impedance through the winding 99 the motor 55C rotates in one direction at maximum speed for longitudinal travel of the tool 10 along the work piece 16. As core 21 moves away from neutral in either direction the current flow ($I_A$ or $I_B$) increases from zero, through the winding 95 always in the same direction, and opposing or counteracting the effect of the bias saturating winding 97. At maximum displacement of the core 21 the bias winding saturation is nearly overcome and the motor 55C ceases to rotate and the longitudinal travel of the tool 10 is stopped.

It is to be noted that regardless of the direction of deviation of the core 21 from neutral position the speed of the motor 55c is always in the same direction, but as the current flow in the winding 95 is increased and the total saturation is decreased the motor slows down. When the reactor is completely saturated by the bias winding 97 the motor rotates at full speed.

Through the provision of the double-throw switch 100 I am enabled to connect the capacitor-run motor 55C directly across the alternating current power source in such manner as to run it at maximum speed in opposite direction to thereby traverse the tool 10 by rapid return to its initial travel position. In other words, after the tool cut has been accomplished I would throw the switch 100 from the position shown in Fig. 8 to the alternate position and the motor 55C would return the tool 10 to its initial position.

Figure 11:
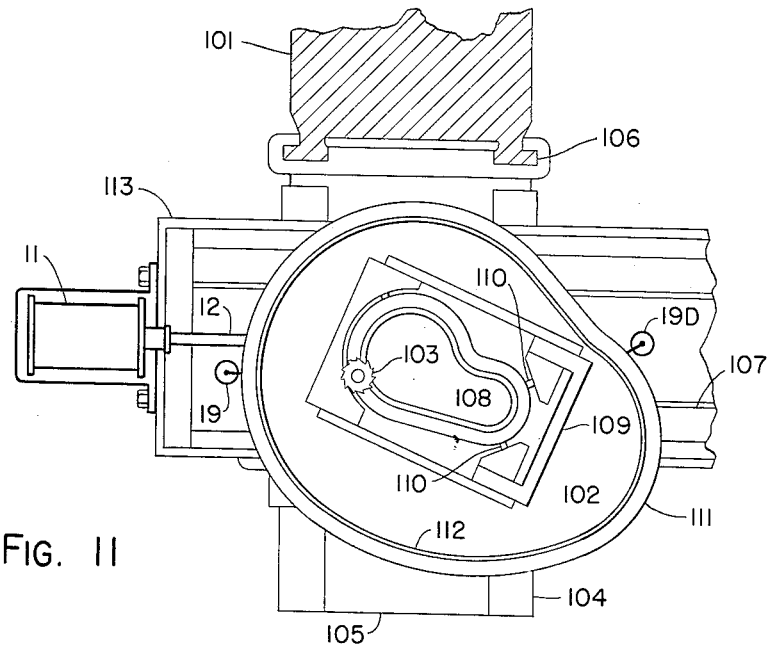
Fig. 11 illustrates my invention as applied to a milling machine.

Referring now to Fig. 11, I therein show a view looking down on a vertical milling machine having a column 101, a work table 102 and a rotatable form milling cutter 103. The work table 102 is carried on a saddle 113 mounted on horizontal guideways 104 carried by a knee 105 which is supported in vertical guideways 106 formed on the column 101. The cutter 103 while rotating is normally in fixed axial position. The work table 102 rotates and is movable horizontally along the guideways 107.

At 108 is shown a typical work piece consisting of a concave forging of more or less elliptical shape and in rough form having a raised blank face extending around its entire periphery. The machining operation which I have chosen as illustrating my invention includes forming a male flange face on this blank. The cutter 103 is suitably shaped to relieve the outer edge of the flange, and by my invention the rotating work piece is automatically moved along the guideways 107, relative to the cutter 103, so that the latter accurately forms the outer profile of the raised portion of the flange.

The work piece 108 is shown as being secured to a fixture 109 by adjustable clamping means 110. Because of the nature of the machining operation to be performed, the fixture 109 is secured to the work table 102 and is rotated at desired speed by a hydraulic motor similar to the one designated 53 in Fig. 1 and controlled in a manner described in connection therewith. In other words, the rotation of the table 102 may be at a variable speed dependent upon the particular shape of the contour to be produced. Machining of the work piece 108 is completed in one revolution of the work table 102; the work piece being moved relative to the cutter 103 to accurately profile the male flange by means now to be described.

The fixture 109 has a horizontally extending skirt 111 forming a cam or template, the contour of which is formed to produce the desired contour of the raised portion of the flange on the work piece 108. A raised barrier 112 is preferably employed to hold chips cut from the work piece from scattering.

Supported by the saddle 113 is the tracer element 19 having its tracer arm 20 engaging the periphery of the cam 111. The device 19 controls the hydraulic motor 11 driving the piston rod 12 for horizontally positioning the work table 102 along the guides 107 on the saddle 113.

Figure 12:
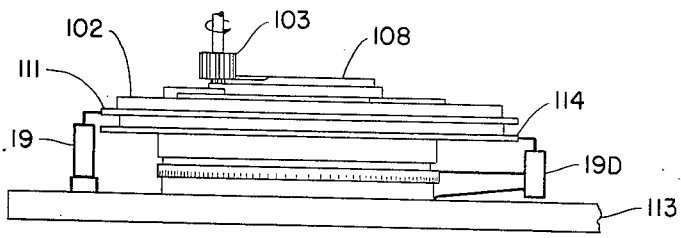
Fig. 12 is a partial elevation of Fig. 11.

In Fig. 12 I show an elevation of a portion of the milling machine of Fig. 11. I provide a second cam or template 114 rotatable with the work table 102, the work 108 and the cam 111. Engaging the cam 114 is the contact arm 20D of a tracer 19D mounted on the non-rotatable portion of the work table 102. The tracer 19D is, however, movable along the ways 107 of the saddle 113 with the rotatable and the non-rotatable portion of the work table.

A motor similar to the motor 53 for rotating the rotatable portion of the work table 102 is movable along the ways 107 with the entire work table assembly. This motor is controlled by the tracer 19D in engagement with the cam 114 and functions to provide a speed of rotation of the work piece dependent upon the cam profile 114.

In general, the arrangement is such that the cam 111 provides for transverse movement of the work 108 relative to the cutter 103, and while the work 108 is making one complete revolution. The cam 114 functions to determine the speed of rotation of the work piece 108 relative to the cutter 103 during the single revolution of the work piece. The hydraulic motors 11 and 53 under the control of the tracer assemblies 19 and 19D respectively may be of the type described and controlled as described. In other words, the hydraulic motor 11 is adapted to position the work table assembly back and forth relative to the cutter 103 and at a variable speed. The motor 53 rotates the work always in one direction but at a speed dependent upon the contour of the cam 114.

While I have chosen to describe certain preferred embodiments of my invention, namely, in connection with a lathe or a milling machine, it will be understood that I am not to be limited thereto but that my invention is equally applicable to any metal forming machine where it is desired to shape a work piece to the configuration of a master cam or template by relatively moving the tool or work piece.

What I claim as new, and desire to secure by Letters Patent of the United States, is:

1. In a material forming machine having a relatively movable tool and work piece, a pair of capacitor-run motors for effecting relative movement of said tool and work piece simultaneously in angularly related paths, a pattern having the desired shape of the work piece, a tracer mechanism scanning the pattern as the tool traverses the work piece and adapted when displaced to effect a change in an electrical characteristic in opposite directions from a normal, and an electric network including the motors and tracer, said network including a source of alternating current, a pair of saturable core reactors connected to regulate current from said source for directional speed control of one of the motors and a single saturable core reactor connected to regulate current for speed control only of the other motor, both said pair and said single reactors having cores, and means to variably saturate said cores in accordance with the characteristic change from normal.

2. In combination, an alternating current electric motor, a network for controlling the speed of rotation of said motor including, a saturable core reactor having an alternating current winding connected to control current flow to said motor for speed control thereof and having two direct current saturating windings in bucking relation to each other, said saturating windings being termed a control winding and a bias winding, a hand adjustable supply of direct current for the bias winding which at maximum alone would cause the motor to rotate at a selected maximum speed, a source of direct current for the control winding, means sensitive to changes in a variable in either direction from a normal for always increasing the current flow in the said control winding upon increase or decrease in the variable from said normal to a limit in saturating effect always below the saturating effect of the bias winding whereby upon deviation of the variable from normal the motor speed is always decreased and in amount dependent upon the amount of deviation of the variable in either direction from normal.

ANTHONY J. HORNFECK.

REFERENCES CITED

The following references are of record in the file of this patent:

UNITED STATES PATENTS

| Number | Name | Date |
|---|---|---|
| 1,921,983 | Whittkuhns | Aug. 8, 1933 |
| 2,116,593 | Bouvier et al. | May 10, 1938 |
| 2,150,032 | Herman et al. | Mar. 7, 1939 |
| 2,226,677 | Vikhman | Dec. 31, 1940 |
| 2,228,902 | Allen | Jan. 14, 1941 |
| 2,245,894 | Arms | June 17, 1941 |
| 2,259,472 | Johnson | Oct. 21, 1941 |
| 2,275,317 | Ryder | Mar. 3, 1942 |
| 2,310,955 | Hornfeck | Feb. 16, 1943 |
| 2,313,989 | Caldwell et al. | Mar. 16, 1943 |